April 2, 1946.  N. BELLOMO  2,397,524

PROPELLER WITH VARIABLE PITCH

Filed Nov. 25, 1940

Inventor
NICOLA BELLOMO

By [signature]
Attorney.

Patented Apr. 2, 1946

2,397,524

UNITED STATES PATENT OFFICE 2,397,524

PROPELLER WITH VARIABLE PITCH

Nicola Bellomo, Bari, Italy; vested in the Alien Property Custodian

Application November 25, 1940, Serial No. 367,128
In Italy December 6, 1939

7 Claims. (Cl. 170—163)

The present invention relates to an improved variable pitch propeller mechanism of the epicycloid type having combined therewith an electrically operated safety device supplemented by mechanical blocking means arranged to prevent the pitch of the propeller blades from reaching dangerous extremes.

The safety device is such as to be disconnected only when fully feathered blade pitch or negative blade pitch is wanted, the safety device remaining connected and being automatically operative in all other cases, even when control of the changes of pitch are determined by a regulator operating in conformity with the speed of revolution of the engine driving the propeller.

The change pitch mechanism may be driven by a suitable electric motor or by the engine which drives the propeller, by means of electromagnetic couplings.

In the appended drawing, wherein embodiments of the invention are shown somewhat diagrammatically and for purposes of illustration only:

Figure 1:
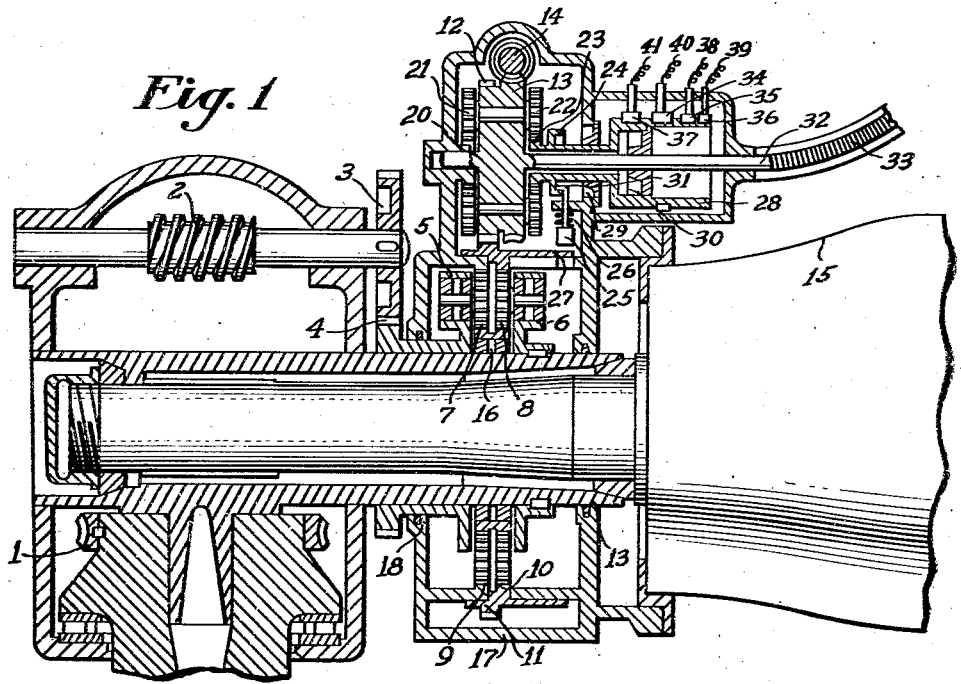
Figure 1 is a side view including portions in longitudinal section taken through the pitch control mechanism, the propeller hub, and the blade turning means, respectively.

On the root of each propeller blade, as shown in Figure 1 of the drawing, a wormwheel 1 is fastened and is in mesh with an endless worm 2 which is fixed to a gear 3. The gears 3, one for each blade, all mesh with the gear 4 which is free to turn axially on the propeller hub. The gear 4 is fixed on the support 5, to which two or more pinions 7 are bolted.

To the support 6 which is fixed on the hub, are bolted the pinions 8 which have the same pitch-circle and are fixed in coaxial relation to the pinions 7.

The pinions 7 and 8 mesh with the double crown gear 16 which turns freely on the hub, and the pinions 7 mesh with the crown gear 9 which is fixed on the hub, and the pinions 8 mesh with the crown gear 10 which is coaxial on the hub and has the same pitch-circle as the crown gear 9.

The crown gear 9 is turned only when it is desired to change the pitch of the propeller blades, otherwise it is stationary. It is provided with external teeth which are coaxial with respect to the hub 11 to which pitch-changing rotation is transmitted by the gear 12. For this purpose the gear 12 is fixed to a wormwheel 13 which is turned by the endless worm 14 which is fixed to the shaft of the electric motor or to a shaft which may be turned by the propeller driving engine directly by means of electro-magnetic joints. Rotation of the worm 14 in one direction or the other produces corresponding variations of the pitch of the propeller blades, since rotation of the crown gear 10 toward the fixed crown gear 9 produces relative rotation between the supports 5 and 6, i. e. relative rotation of the support 5 toward the hub, and thereby rotation of the gears 4 and 3, and finally of the propeller blades.

The described mechanism is enclosed in a box 17 and lubricated by oil splash, for which reason the seals 18 and 19 are used. The seals 29 and 30 impede also the passage of oil toward the electric safety unit which is described hereinbelow.

Figure 2:
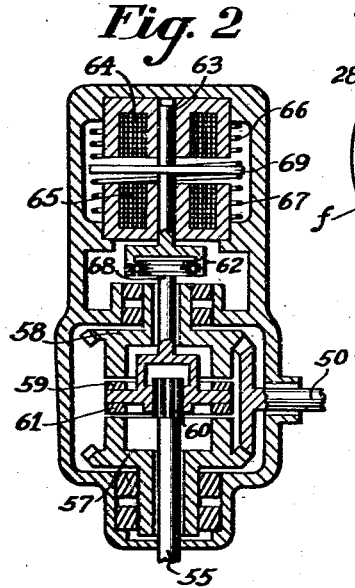
Figure 2 shows in longitudinal section an embodiment of the invention involving actuation of the pitch change mechanism by the propeller driving engine instead of by a separate electric motor as in Figure 1.

Operation and control of the worm 14 may also be done, as pointed out above, by direct drive from the engine as indicated in Figure 2. The shaft 55 controls the worm 14, and rotates either to the right or to the left to vary the pitch. The shaft 55 is turned by the engine in any suitable way.

The bevel pinion which is fixed to the shaft 55 drives the bevel gears 57 and 58, which are thereby turned in opposite directions. The end of the shaft 55 is splined at 60 in the disk 59 so that the latter can slide relative to the shaft 55 and carry the friction clutch or claw coupling element 61 into and out of engagement. The shaft 68 of the disk 59 may be axially controlled by the rod 63 through a double ball thrust bearing 62. To the rod 63 is fixed the disk 69, constituting the mobile armature of two opposed electromagnets 64 and 65. The springs 66 and 67 return the disk 69 to its intermediate position. The disk 69 moves when it is attracted by one electromagnet or the other, thereby causing the friction clutch elements 61 to engage with the gear 57 or with gear 58 and thereby turn the shaft 55 clockwise or counterclockwise.

The double ball thrust bearing 62 prevents the rod 63 from following the shaft 68 when the latter is rotating.

What has been described above with reference to Figure 2 as to how the necessary power for varying the pitch may be derived from the engine itself is only exemplary, and may be arranged in any suitable manner.

The shaft 32 of the compound gear 12, 13 is prolonged to connect with the flexible cable 33 which may drive a pitch-indicator (not shown) which is provided with a multiplier placed in position to be seen by the crew of the airplane.

By means of the multiplier the gear 12, 13 moves the step-cut desk 24 of the blocking device and the drum on which the segmental contacts of the electrical safety device are fixed.

For example, the multiplier as shown in the drawing (Figure 1) is of the epicylcoid type and it is constituted by the sunwheels 21 and 22 which are linked with each other, with the fixed gear 20, and with the mobile gear 23. The gear 20 meshes with the sunwheels 21 and the gear 23 which is yielding meshes with the sunwheels 22. The proportion of reduction depends on the number of teeth on the gears 20, 21, 22 and 23, and it must be fixed in such a way that at the maximum pitch positions which have been predetermined for the propeller blades, the yielding gear 23 makes less than one complete revolution.

Figure 3:
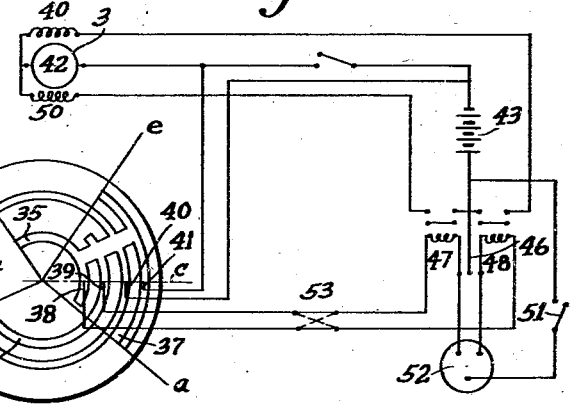
Figure 3 is a wiring diagram of the invention including the electrically operated safety device.

On the drum 28 is fixed, as shown in Figure 3, a ring of conductive material 34 and three conductive segments 35, 36 and 37, on which bear the brushes 38, 39, 40, and 41 that are connected with the circuit of the electric motor 42.

In Figure 3 a disk is shown instead of the drum 28, for the sake of clearness of illustration.

The ring 34 and the segments 31, 35, 36 and 37 are electrically connected together. In Figure 3, the electric motor is shown arranged for continuous current energization, with two fields for operation in either direction, the current being supplied by a battery or generator. On the disk 28 are indicated at $d$ the radius of the disk corresponding to the radius C on which the contact brushes are lined when the propeller blades reach the maximum safety pitch for the condition of flight; with $e$ designating the analogue radius for the minimum pitch, with $f$ designating the analogue radius for the fully feathered blade position; and with $g$ designating the analogue radius for the negative pitch position of the blades.

The ring 34 is electrically connected with the negative pole of the battery. When the switch 44 is open, the negative pole of the battery is connected with the brush 45 of the motor through the segment 37 and the brush 41. In this way, the circuit is interrupted when either the maximum or the minimum pitch position is reached, and the electric motor is deenergized.

The manual control of the motor is executed by means of a commutator 46 which acts upon the relays 47 and 48 (which may be combined in a double relay) so as to change the connection of the positive side of the battery to one field 49 or the other 50, of the motor. The automatic revolution regulator 52 may be substituted for the commutator 46 when the switch 51 is closed, and it works in the same way as the commutator 46, in relation, however, to the velocity of rotation of the motor, as is known.

The relays 47 and 48 are connectible with the negative pole of the battery through the segments 39 and 35, and that is why one of them is excluded just before the minimum or the maximum blade pitch is reached with automatic operation in use. In the case illustrated in the drawing the relay 48 controls the increases of pitch and it becomes disconnected when the maximum pitch is almost reached.

The relay 47 controls the diminutions of pitch and it is disconnected when the minimum pitch is almost reached. When one of the limits has been reached, the pitch cannot go on changing in the same direction, but it can turn backwardly or reverse, since the other relay has not become disconnected.

In order to move to fully feathered blade position or into negative pitch, it is necessary to open the switch 51 so as to disconnect the regulator 52, to close the switch 44 in order to disconnect the safety segment 37, to exchange the wires 53 as shown in dotted lines, and finally, to control the increase of pitch for the fully feathered blade position, and decrease the same toward negative pitch by means of the commutator 46. Needless to say, all the said regulating operations may be executed by means of a single handle on the airplane dashboard, the pointer of which may assume various positions, such as six positions indicating fixed pitch, increase of pitch, decrease of pitch, automatic operation, fully feathered blade position, and negative pitch.

In many cases the fully feathered blade position or pitch variation are not wanted and the arrangement in that case is simple.

The angular development of the segments 35 and 36 is such that after reversing the wires at 53, the segment 35, which first served as block for the maximum pitch now serves as block for the negative pitch, and the segment 36, which first served for diminishing the pitch by blocking it to the fully feathered blade position.

The foregoing electrical arrangement has been set forth only for illustration, since it can be realized with various modifications.

Besides the described electrical safety device a mechanical block may also be added, which is constituted by the cylinder 25, as shown in Figure 1, the bent tail of which is normally held by the circular step 24 rotating with the wheel 23. The circular step 24 is interrupted in conformity with the prearranged pitch limits, so that once these pitch positions are reached the spring 26 pushes the cylinder 25 downwardly so as to stop the step 27 which is fixed to the crown gears 10 and 11.

The mechanical block provides further safety in addition to that constituted by the electrical safety device, whereby none of the normal predetermined pitches of flight will be overrun. It cannot be employed, or at least not without suitable controlling means where both the fully feathered pitch position and the negative pitch position are required.

What I claim is:

1. A variable pitch propeller comprising a rotating hub, a plurality of blades mounted in said hub for rotation about axes substantially transversely of the hub axis, a member loosely mounted coaxially on said hub, means coupling said member to said blades to transmit rotary motion of said member relative to the hub into pitch variation of said blades, a first carrier carried by said member, a second carrier fixed to said hub, a gear loosely mounted on said hub between said carriers, pinions carried by said carriers and meshing with said gear, a fixed ring gear meshing with pinions carried by the loosely-mounted carrier, a rotatable ring gear meshing with pinions carried by the carrier fixed on the hub, a rotary element for rotating said rotatable ring gear, and means for transmitting rotation from the rotary element to said rotatable ring gear.

2. A variable pitch propeller comprising a rotating hub, a plurality of blades mounted in said hub for rotation about axes substantially transversely of the hub axis, a member loosely mounted coaxially on said hub, means coupling said member to said blades to transmit rotary motion of said member relative to the hub into pitch variation of said blades, a first carrier carried by said member, a second carrier fixed to said hub, a gear loosely mounted on said hub between said carriers, pinions carried by said carriers and meshing with said gear, a fixed ring gear meshing with pinions carried by the loosely-mounted carrier, a rotatable ring gear meshing with pinions carried by the carrier fixed on the hub, a rotary element for rotating said rotatable ring gear, and an electromagnetic coupling device for transmitting rotation from the rotary element to said rotatable ring gear.

3. In a variable pitch propeller having a rotary operating member, an electric motor driving said operating member and having an armature and two opposed field windings, a rotary control member driven with said operating member, a plurality of connected arcuate conductor strips on said control member, fixed brushes engaging said strips, one of said strips extending through 360° and being connected to one terminal of a source of electrical energy, another of said strips extending through an arc proportional to the range of flying pitch variation and being connected to the armature of said motor for connecting said terminal of the source of electrical energy to the armature, relay means having one winding energizable to connect one field winding to the other terminal of the source of energy and a second winding energizable to connect the other field winding to said other terminal of the source of energy, means for connecting one end of each relay winding to said other terminal of the source of energy, another of said conductor strips extending from a point on said control member engaged by the brushes when the propeller is at negative pitch to a point short of the position reached when the propeller is at maximum flying pitch, means connecting said last-mentioned strip to the other end of one relay winding, another strip extending from a point on said control member, which registers with the brushes when the propeller is fully feathered, to a point short of registry with the brushes in minimum pitch, and means connecting the brush engaging said last-recited strip with the other end of said other relay winding.

4. A mechanism according to claim 3 further including means for interchanging the connections between the relay windings and the conductor strips to which they are connected.

5. A mechanism according to claim 3 further including disengageable mechanical stop means for limiting the positions to which the operating members are rotated.

6. A variable pitch propeller comprising a rotating hub, a plurality of blades mounted in said hub for rotation about axes substantially transversely of the hub axis, a member loosely mounted coaxially on said hub, means coupling said member to said blades to transmit rotary motion of said member relative to the hub into pitch variation of said blades, a first carrier carried by said member, a second carrier fixed to said hub, a gear loosely mounted on said hub between said carriers, pinions carried by said carriers and meshing with said gear, a fixed ring gear meshing with pinions carried by the loosely-mounted carriers, a rotatable ring gear meshing with pinions carried by the carrier fixed on the hub, a rotary operating member for rotating said rotatable ring gear, an electric motor driving said operating member and having an armature and two opposed field windings, a rotary control member driven with said operating member, a plurality of connected arcuate conductor strips on said control member, fixed brushes engaging said strips, one of said strips extending through 360° and being connected to one terminal of a source of electric energy, another of said strips extending through an arc proportional to the range of flying pitch variation and being connected to the armature of said motor for connecting said terminal of the source of electrical energy to the armature, relay means having one winding energizable to connect one field winding to the other terminal of the source of energy and a second winding energizable to connect the other field winding to said other terminal of the source of energy, means for connecting one end of each relay winding to said other terminal of the source of energy, another of said conductor strips extending from a point on said control member engaged by the brushes when the propeller is at negative pitch to a point short of the position reached when the propeller is at maximum flying pitch, means connecting said last-mentioned strip to the other end of one relay winding, another strip extending from a point on said control member, which registers with the brushes when the propeller is fully feathered, to a point short of registry with the brushes in minimum pitch, and means connecting the brush engaging said last-recited strip with the other end of said other relay winding.

7. A mechanism according to claim 6 further including means for interchanging the connections between the relay windings and the conductor strips to which they are connected.

NICOLA BELLOMO.